(12) United States Patent
Gilhousen

(10) Patent No.: US 6,433,740 B1
(45) Date of Patent: *Aug. 13, 2002

(54) DETERMINATION METHOD FOR USE WITH ANALOG CELLULAR SYSTEM

(75) Inventor: Klein S. Gilhousen, Bozeman, MT (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/568,441

(22) Filed: Dec. 7, 1995

Related U.S. Application Data

(63) Continuation of application No. 08/218,197, filed on Mar. 25, 1994, now abandoned.

(51) Int. Cl.[7] .............................. G01S 5/04; G01S 1/24
(52) U.S. Cl. ..................... 342/442; 342/387; 342/453; 342/465
(58) Field of Search .................... 342/126, 127, 342/387, 394, 442, 458, 457; 324/76.77; 455/456

(56) References Cited

U.S. PATENT DOCUMENTS

| | | | | |
|---|---|---|---|---|
| 3,646,580 A | * | 2/1972 | Fuller et al. ................ | 342/457 |
| 3,680,121 A | * | 7/1972 | Anderson et al. ........... | 342/457 |
| 3,848,254 A | * | 11/1974 | Drebinger et al. .......... | 342/457 |
| 3,886,554 A | * | 5/1975 | Braun et al. ................ | 342/457 |
| 4,651,156 A | * | 3/1987 | Martinez .................... | 342/457 |
| 4,675,614 A | * | 6/1987 | Gehrke ...................... | 324/76.77 |
| 4,812,852 A | | 3/1989 | Bent et al. ................. | 342/457 |
| 5,045,861 A | * | 9/1991 | Duffett-Smith ............. | 342/457 |
| 5,173,710 A | | 12/1992 | Kelley et al. .............. | 342/463 |
| 5,293,642 A | | 3/1994 | Lo ............................ | 455/56.1 |
| 5,293,645 A | | 3/1994 | Sood ........................ | 455/54.1 |
| 5,317,323 A | * | 5/1994 | Kennedy et al. ............ | 342/457 |
| 5,327,144 A | * | 7/1994 | Stilp et al. ................ | 342/387 |

FOREIGN PATENT DOCUMENTS

| | | | | |
|---|---|---|---|---|
| WO | 7900887 | 11/1979 | ............ | H04Q/7/04 |
| WO | 8701087 | 5/1987 | ............ | G01S/1/16 |

OTHER PUBLICATIONS

Smith, W.W., Jr. "Passive Location of Mobile Cellular Telephone Terminals" Security Technology, 1991. Proceedings. 25th Annual 1991 IEEE Int'l Carnahan Conf. pp. 221–225, Oct. 1991.*

Zablotney, Joseph H. et al. "An Accurate Search and Rescue Location System". Proc. Annual Meeting on Navigation and Exploration. pp. 459–467, Jun. 1991.*

* cited by examiner

*Primary Examiner*—Gregory C. Issing
(74) *Attorney, Agent, or Firm*—Philip Wadsworth; Charles Brown; Kevin Cheatham

(57) ABSTRACT

A method and apparatus for determining the location of a mobile unit within a cellular system. A synchronized signal at a common phase is generated at each base station in a system. The mobile unit transmits a signal tone. Each base station compares the phase of the signal tone to the common phase of the synchronized signal to produce a phase offset. A system controller compares the difference between the phase offset of a first base station and the phase offset of a second base station and determines the difference in distance between the first base station and the mobile unit and the second base station and said mobile unit defining a hyperbolic or linear curve of locations. The system controller compares the difference between the phase offset of the first base station and the phase offset of a third base station and determines the difference in distance between the first base station and the mobile unit and the third base station and said mobile unit defining a second hyperbolic curve of locations. The system controller determines the intersection of the first and the second hyperbolic curves thus determining the location of the mobile unit.

9 Claims, 4 Drawing Sheets

DETERMINATION METHOD FOR USE WITH ANALOG CELLULAR SYSTEM

This is a continuation of application Ser. No. 08/218,197 filed Mar. 25, 1995 now abandoned.

BACKGROUND OF THE INVENTION

I. Field of the Invention

The present invention relates to position location. More particularly, the present invention relates to a novel and improved method of locating a mobile unit using a plurality of base stations.

II. Description of the Related Art

The following disclosure describes a method and apparatus for determining the position of a mobile unit operating in the cellular radio service. A position service would have many desirable applications in the cellular radio service such as, location service for emergency calls (911), child locators, dispatch services, and fleet monitoring systems. Also, cellular system operators could use such methods to customize service parameters based on accurate knowledge of mobile unit location such as lower cost services for limited mobility customers. Such a service would also be of use in locating stolen cellular phones and for investigating fraudulent use of cellular services.

Methods for radio position determination make use of techniques for measuring the propagation delay of a radio signal which is assumed to travel in a straight line from a transmitter to a receiver. A radio delay measurement in combination with an angle measurement provided by a directive antenna is the fundamental principle of radar. Radar location is frequently augmented by use of a transponder in the mobile vehicle rather than relying entirely on the signal reflected by the mobile vehicle.

Alternatively, multiple time delay measurements can be made using multiple transmitters and/or receivers to form a so-called tri-lateration system. The Loran system is an example of a system which transmits a series of coded pulses from base stations at know and fixed locations to mobile receivers. The mobile receiver compares the times of arrival of signals from the different transmitters to determine hyperbolic lines of position. Similarly, the global positioning system (GPS) provides transmission from a set of 24 earth orbiting satellites. Mobile receivers can determine their position by using knowledge of the satellites' locations and the time delay differences between signals received from four or more satellites.

From the above examples, it can be seen that radio position location systems can be divided into two types, those which allow a mobile unit user to determine its own position and those which allow another party to determine the position of a mobile unit transponder such as radar systems. The system herein disclosed is of the second type where the fixed portion of a cellular telephone system determines the location of a mobile unit cellular telephone. Generally, such systems require that the mobile unit user transmit a radio signal (except in the case of passive radar.)

Methods of radio location, such as disclosed in U.S. Pat. No. 5,126,748, issued Jun. 30, 1992, entitled "DUAL SATELLITE NAVIGATION SYSTEM AND METHOD", assigned to the assignee of the present invention, require the mobile terminal to both transmit and to receive which allows round trip timing measurements defining circular lines of position to be performed using fewer transmitter sites than required for the Loran and GPS systems in which the mobile terminals contain only receiving capability. In other systems, the mobile terminal may contain only a transmitter and the remaining system elements perform direction finding or multiple receptions of the signal from different locations to determine the position. An example of this is the SARSAT system for locating downed aircraft. In this system, the downed aircraft transmits a signal on the international distress frequency 121.5 MHz (and 273 MHz). An earth orbiting satellite relays the signal to an earth terminal. As the satellite passes overhead, the change in Doppler shift can be detected and a line of position can be determined. Multiple overhead passes by the same or similar satellites can determine a set of lines of position, the intersection of which determines the location of the downed aircraft.

The present invention may make use of the existing capabilities of mobile unit cellular telephones operating in the AMPS service (or similar service) to provide a new service of position location without modifying the millions of already existing AMPS mobile unit cellular telephones. In the AMPS service, the mobile units transmit at UHF frequencies between 824–849 MHz and base stations transmit at frequencies between 869–894 MHz. The frequency bands are divided into two sets of 832 channel pairs evenly spaced 30 kHz apart. A set of 416 channel pairs is licensed to each of two service providers in a given area.

The AMPS system uses analog FM modulation to transmit telephone speech. The mobile unit and base stations transmit simultaneously using full duplex techniques so that the user perceives a continuous link in both directions at all times.

Normally, each base station in a large cellular system serving a metropolitan area will be assigned a set of 57 channel pairs for providing telephone service. Additionally, one channel is assigned for signaling and paging. Calls are initiated at the mobile unit by transmitting a digital message to the nearest base station on its control channel. The base station will respond on its corresponding control channel with a channel assignment to be used by the mobile unit while the call is in progress within the coverage area of this cell. If the call continues while the mobile unit moves into the coverage area of another cell, a control message from the base station will command the mobile unit to change channels to one assigned to the cell the mobile unit is moving into. This process is called handoff.

The AMPS system includes a technique called supervisory audio tone (SAT) to insure that calls are being handled by the proper base stations. In this system, each base station adds a high frequency audio tone to the telephone audio of each call in progress. This tone will either be transmitted at 5980, 6000, or 6030 Hz. The mobile unit will detect and filter this tone and transmit it back to the base station by adding it to the telephone audio. The base station then filters and detects the SAT tone and insures that the received tone is the same frequency as the tone it transmits. A pattern of SAT tone assignment to different neighboring base stations allows instances of incorrect connections to be detected and corrected.

When the AMPS system was originally being defined, it was contemplated that the mobile units' positions could be located by measuring the phase difference between the forward link SAT tone and the SAT tone received by the base station from the mobile unit. This would permit a round trip time delay measurement which would locate the mobile unit on a circle around the base station. It was seen that this technique would introduce the need for a specification controlling the phase shift of the returned SAT tone in order to provide consistent measurements. Because of this added complexity, this approach was dropped from the specification.

SUMMARY OF THE INVENTION

When the system desires to locate a particular mobile unit, the mobile unit is commanded to go to a predetermined and dedicated channel and transmit an audio tone over it's FM transmitter for a short interval, say one to ten milliseconds. The audio tone's frequency should be above the speech spectrum, e.g. greater than 4 kHz. At the end of the tone burst, the mobile unit returns to whatever it was doing previously, e.g., continuing its call, idle mode, etc. The channel frequency used for the position determination service would normally be dedicated to this purpose throughout the system and a system controller would ensure that only one mobile unit at a time transmits a positioning signal.

At the same time that the control message is sent to the mobile unit, the base stations are sent a control message indicating that a mobile unit is about to transmit a tone burst. The base stations are equipped with GPS receivers allowing accurate time and frequency references to be available at each base station. The base stations produce a tone reference signal at the same frequency and with synchronized phase based on the GPS receiver. The base station measures the phase difference between the tone reference signal and the signal tone (if any) received from the mobile unit. The measurement interval used is the same as the transmission time, normally about one to ten milliseconds. The phase difference measurements are reported to the system controller along with a measurement of signal to noise ratio (S/N) of the measurement.

The mobile unit's position is calculated by computing phase differences between the tone burst phases reported by adjacent base stations. For example, if two adjacent base stations report the same phase difference relative to the reference phase, then the mobile unit is known to be somewhere on the perpendicular bisector between the two stations. If the phases are unequal, then the mobile unit is known to be on a hyperbola which is the locus of points having the same measured phase difference. If a third base station reports a phase measurement, then two more hyperbolas are determined. The intersection of the hyperbolas determines a solution for the mobile unit's location.

The precision required for the phase measurement is on the order of one degree. For example, 100 meter precision (300 ft) requires about 300 nsec. precision. If the tone burst were 6 kHz in frequency, then about one-half degree resolution in the phase measurement would yield the desired precision. Note that this order of precision should be easily obtainable if the S/N is high enough.

It is possible to use the SAT signal (supervisory audio tones) for the above purposes. In the AMPS system, each base station transmits on the forward channel a tone of either 5980, 6000, or 6030 Hz. The mobile unit receives this tone and retransmits it on the reverse channel.

One could perform position determination of any standard AMPS phone by the following method:

1) a call is established with the mobile unit in the normal fashion; a command is sent to the mobile unit ordering it to change channels to a predetermined positioning channel;

2) the base station with which the mobile unit was communicating transmits on the positioning channel a predetermined SAT tone assignment, usually 6000 Hz;

3) the mobile unit receives and retransmits the SAT tone in the normal way; the surrounding base stations measure the phase difference between the returned SAT tone and the reference tone derived from a received GPS timing signal;

4) the measurements are collected at a central point and the position computed; and 5) the mobile unit is commanded to return to its previous frequency and continues any call it may have in progress.

It is possible, using the SAT tone method, to track the position of the mobile unit as the call continues. The connected base station and the neighbor base stations can continue to measure the SAT tone phase difference relative to the synchronized reference tones on the normal cellular communication signals. However, the SAT tone frequency (the so-called SAT color code) now varies from one base station to another and the proper measurement must be made for each case. Also, the possibility of co-channel interference from mobile units in nearby co-channel cells can degrade the measurement accuracy. If, at any time during a call, a more accurate position is needed, the mobile unit can be commanded to the dedicated measurement frequency.

The S/N required to achieve the desired accuracy is determined by the received S/N and the averaging time. A half-degree resolution corresponds to seven bits of resolution. Each bit of resolution requires an additional 6 dB of S/N so that the total S/N is required to be 42 dB. If the received signal has a 20 dB S/N in a 4 kHz bandwidth, then the bandwidth must be narrowed 22 dB. This would appear to require a four millisecond measuring time.

Note that mobile unit terminal motion should not significantly affect the measurement. Consider that in four milliseconds, a mobile unit moving at 100 ft/sec will travel only 0.4 feet, significantly less than the measurement resolution.

Note also that the SAT tone frequency of 6 KHz is adequate to support unambiguous positioning in typically sized cellular telephone systems. The ambiguity distance for this tone frequency is about 50 kilometers corresponding to one complete cycle of the waveform or 166.7 microseconds.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
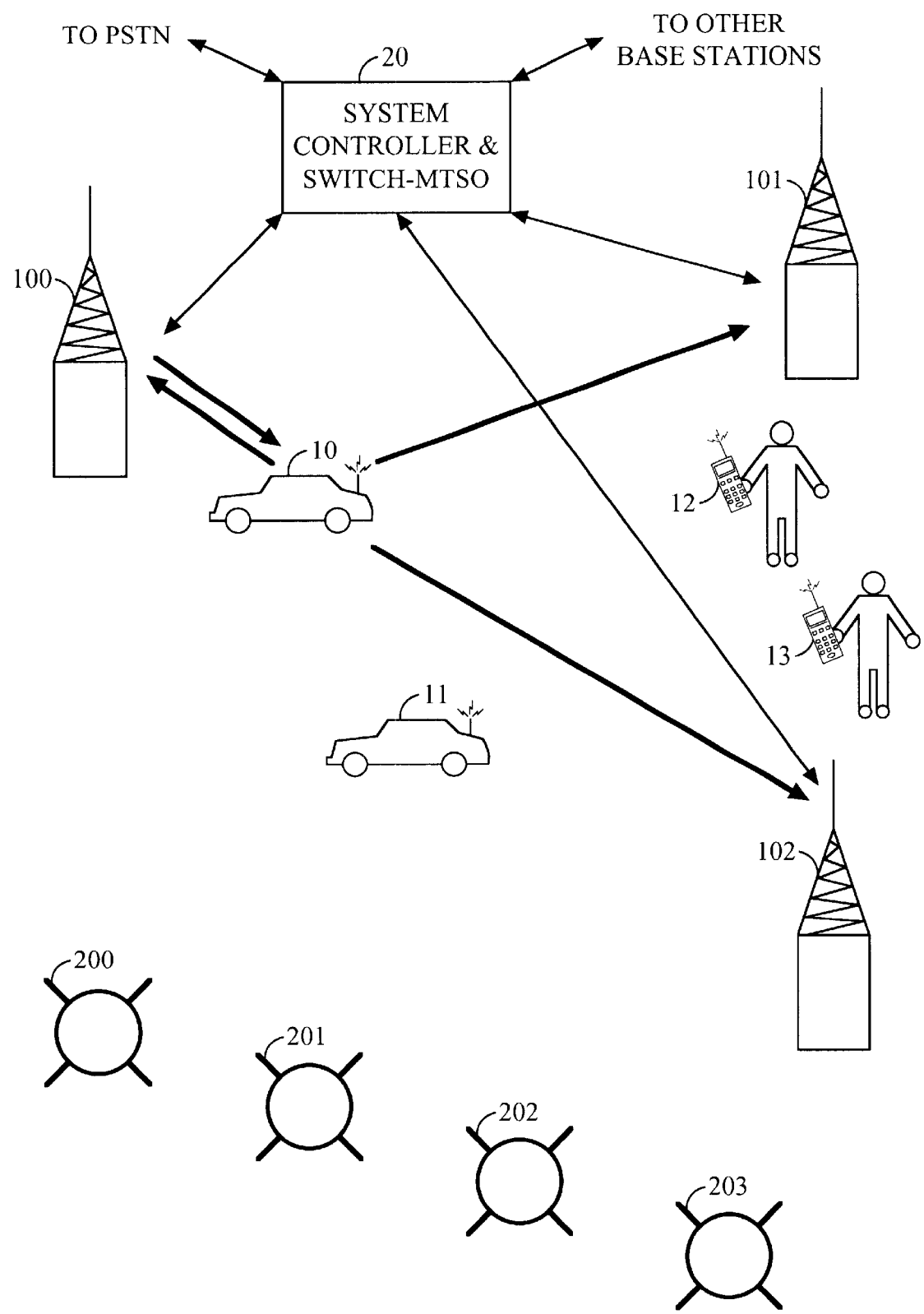
FIG. 1 is an overall block diagram of an exemplary cellular system.

An overall block diagram of the system is shown in FIG. 1. The cellular system is comprised of base stations 100, 101, 102 and possibly many additional base stations and system controller & switch 20, also known in the cellular industry as the Mobile Telephone Switching Office (MTSO). The system subscriber mobile units are depicted as both car telephones 10 and 11 and pocket sized portable cellular telephones 12 and 13.

The disclosed position determination system also utilizes earth orbiting satellites of the Global Positioning System (GPS) 200, 201, 202 and 203 as a means of precise synchronization. The GPS system is comprised of a constellation of 24 satellites arranged in orbits so that four or more satellites are visible any place on earth at all times. These satellites transmit signals that allow precise differences in time of arrival of signals from the satellites in view to be measured by GPS system receivers. The satellites are synchronized to Universal Coordinated Time (UTC) which allows precise time of day and frequencies to be obtained at GPS receivers. This capability of the GPS is utilized as a means for generating precisely synchronized reference tones at each base station.

The cellular system can provide up to about fifty-seven simultaneous telephone calls to mobile units within each base station's coverage area. Normally, each base station is assigned 57 radio frequency channel pairs which are not used in any surrounding base station. Base stations located farther away may reuse the channels in a technique known as frequency reuse. Frequency reuse allows a city to be covered by many hundreds of base stations without running out of channels even though each system has a total of only 416 channels at its disposal.

In the disclosed system it is contemplated that one or more of the 416 channels would be dedicated to the position determination system and not used for telephone calls. This will allow a "clear channel" without co-channel interference from other mobile units, resulting in higher signal-to-noise ratios, shorter measurement times and greater accuracy of position determination. The single channel for position determination would be shared by all the mobile units in the system under control of the system controller. The system controller would determine which mobile units require positions to be determined and transmit the commands, via a base station, to the mobile unit to be measured and the surrounding base stations. If a large number of position measurements must be made, more than one RF channel can be dedicated to this purpose.

It is also possible to use the disclosed techniques to monitor the position of each mobile unit telephone call in the system on a continuous basis rather than a sampled basis by making the disclosed measurements on each call in progress.

Figure 2:
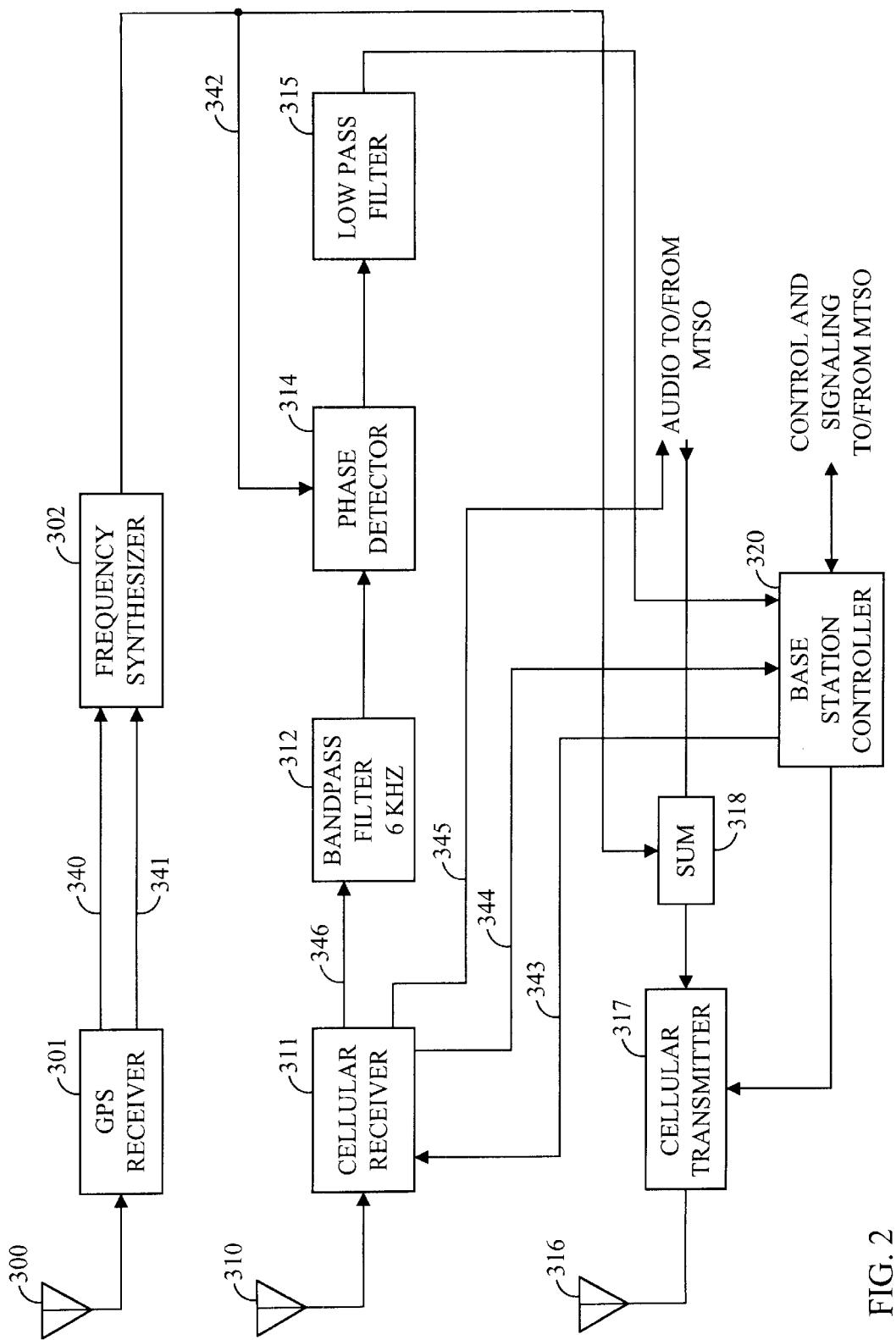
FIG. 2 shows a block diagram of the processing operations performed by the base stations to support the position determination process.

FIG. 2 shows a block diagram of the processing operations performed by the base stations to support the position determination process. The GPS antenna 300 and GPS receiver 301 provide a means for distribution of a common frequency and time reference to the base stations in the network. The Global Positioning System (GPS) consists of a network of 24 satellites in circular inclined orbits around the earth so that every point on the earth has four or more of the satellites continuously in view. The satellites transmit a radio signal modulated by a spread spectrum waveform that allows very precise time measurements to be performed on the received signals. The GPS receivers acquire and synchronize to four or more of the downlink signals from the satellites. Then, the differences in time of arrival between the signals from the different satellites are measured. Together with knowledge of the orbital parameters, which are continuously transmitted on a data link from the satellites, the GPS receiver can solve for its position in three dimensional space and, as a by product, obtains very accurate time of day which is synchronized to universal coordinated time (UTC). If each base station in the system is so equipped, then they can all be synchronized very accurately. Note that for the purpose of the position determination functions, synchronization to UTC is not required, merely synchronization of all base stations to a common reference is required.

It is also possible to use other means for synchronization of the phase measurements at the different base stations. For example, a television broadcast signal could be so utilized. Television broadcast signals normally use highly stable and accurate frequency references for the construction of the color burst and horizontal and vertical synchronization of the picture. These signals, if receivable at all base stations in a city, could be used to synchronize the phase measurement process. The difference in propagation delay from the TV transmitter to each base station would have to be taken into account.

GPS receiver 301 provides a one pulse-per-second (1 pps) signal, 340, and a 1 MHz signal, 341. The 1 MHz signal is used to synchronize a stable oscillator. Synthesizer 302 uses the stabilized 1 MHz and the 1 pps signals to generate a 6000 Hz signal, 342, which is synchronized to a common phase at each of the base stations.

Synthesizer 302 can be quite simple. For example, the 1 MHz signal is multiplied by 12 to produce a 12 MHz signal. The 12 MHz signal is then divided by 2000 in a digital divider. The result is a 6000 Hz square wave signal. The divide circuit is reset by the 1 pps signal at the beginning of each second. This insures that the divide by 2000 circuits in all of the base stations are in the same state at the same time.

The 6 kHz reference signal is summed with the transmit audio from the MTSO in summer 318. The 6 kHz signal is used as the SAT tone for this channel. The resulting signal is converted into a FM transmit signal by cellular transmitter 317. A predetermined 30 kHz channel in the 869–894 MHz band is dedicated for the purpose of position determination. In principle, any of the channels that can be used for a normal telephone call can be used for this purpose. The resulting FM signal is then radiated by the cellular transmit antenna 316. Cellular transmitter 317 with summer 318 is an ordinary cellular base station transmitter with only the additional function of accepting the reference 6 kHz signal from synthesizer 302 for the SAT tone.

Only one of the base stations in the system will transmit to the mobile unit at one time. The surrounding base stations will, however, normally be capable of receiving the signal and making measurements on it.

The mobile unit will receive the signal, demodulate the SAT tone and sum it with its own baseband transmit audio and retransmit it These functions of the mobile unit are the ordinary functions of an AMPS mobile unit during the course of an ordinary cellular telephone call. Thus, no special mobile unit equipment is required to provide the desired services of position determination. Added equipment for position location is installed only in base stations and only in those base stations where the position location service is desired to be provided.

The base station will receive the signal from the mobile unit with cellular receive antenna 310. This signal is then amplified and demodulated by cellular receiver 311. The receiver will accept control signals, 343, from the base station controller 320 and provide a receive signal strength indicator (RSSI) signal, 344, to the controller 320. The controller 320 will relay the RSSI signal along with other signals to the MTSO for use in the calculation of the mobile unit's position. The receive audio, 345, is delivered to the MTSO in the normal manner of an AMPS base station. The only additional function required of receiver 311 beyond that of an ordinary AMPS base station receiver is that the SAT tone signal, 346, be output to bandpass filter 312.

The SAT tone signal added to the mobile unit's transmitted signal is demodulated along with the speech signals in receiver 311's FM demodulator circuit, typically a limiter-discriminator but many other circuits for FM demodulation are known in the art. The SAT tone signal at 6 kHz is separated from the speech signal by bandpass filter 312. This filter might normally have a bandwidth of several hundred Hz. Generally, the narrower the bandwidth of this filter, the higher will be the signal-to-noise ratio of the SAT tone but a longer time will be required for the measurement of the phase of the output signal as it will exhibit a time response proportional to the bandwidth of the filter.

The output of the filter 312 is input to phase detector 314 along with the reference 6 kHz signal from frequency synthesizer 302. The phase detector measures the difference in phase between the reference 6 kHz signal and the received SAT tone. The phase difference will be proportional to the distance between the mobile unit being received and the base station. There are certain phase shifts in the SAT tone which are fixed and may be determined in advance such as the effective phase shift between the input to cellular transmitter 317 and the transmit antenna 316. Phase shift is caused both by the response of filters and equalization circuits in the transmitter as well as physical delays of transporting the signal from one place to another. Likewise, there will be additional phase shifts in the cellular receiver 311 and bandpass filter 312. These phase shifts can be measured and calibrated out of the system as they are fixed.

An additional source of phase shift is caused by the circuits in the mobile unit. The precise value of this phase shift will vary from telephone to telephone, however the general range of phase shift can be determined and calibrated out. Fortunately, the positioning accuracy of the disclosed system does not depend on the phase shift caused by the mobile unit's circuits.

The final source of phase shift, and the most important one, is due to the physical delay of transporting the signal through the air between the mobile unit and the base station. Only the phase shift of transmitting from the mobile unit to the base stations is important to positioning because the relative phase shift is measured in each of three or more base stations. Only one of the base stations is transmitting to the mobile unit so this phase shift is not important, except to establish the operating range of phase detector 314.

Figure 3:
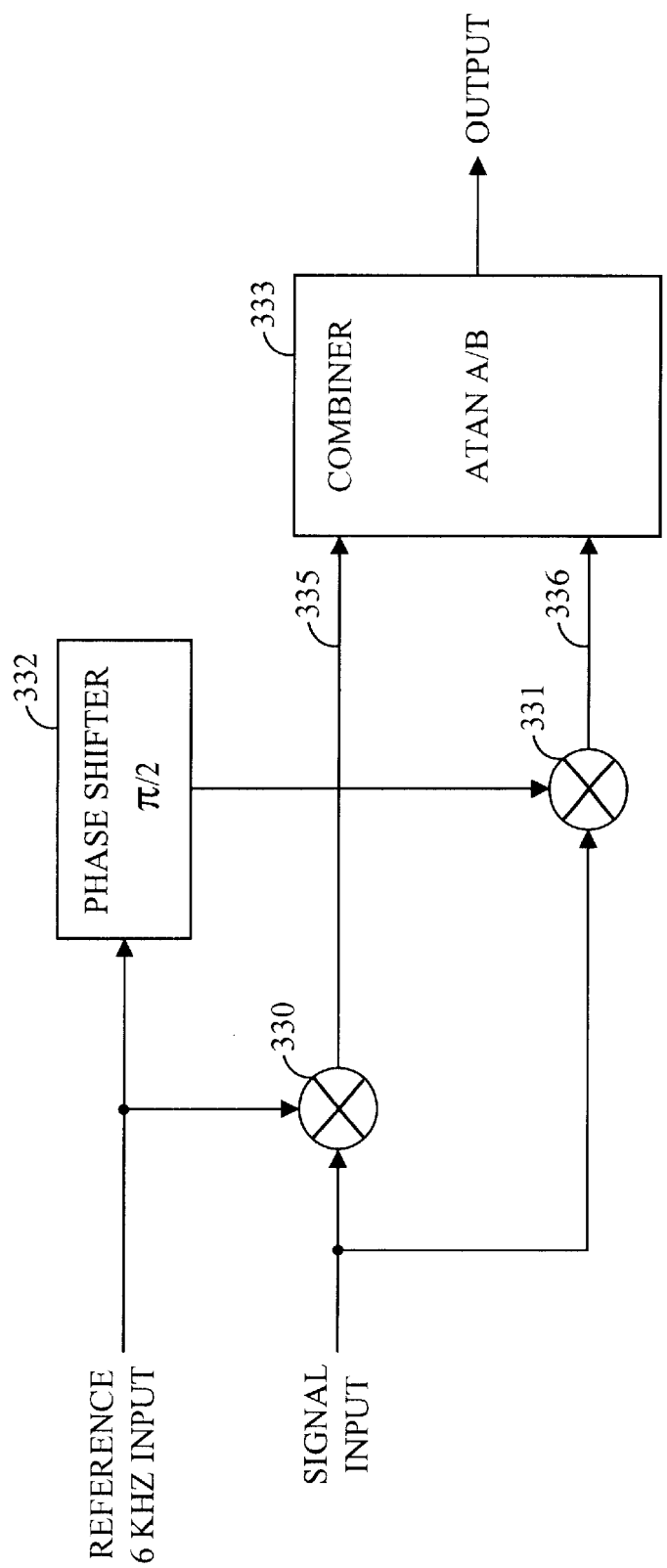
FIG. 3 is a block diagram of a phase detector circuit.

A block diagram of a phase detector circuit is shown in FIG. 3. The input signal is fed to multiplier circuits 330 and 331. The reference 6 kHz signal is fed to the second input of multiplier 330 and to the input of phase shifter circuit 332. The phase shifter circuit shifts the phase of the 6 kHz reference by 90 degrees (or $\pi/2$). The output of phase shifter 332 is fed to the second input of multiplier 331. Circuits for shifting the phase of a sinusoid by 90 degrees are well known in the art. It may be preferable in some cases for the frequency synthesizer 302 to produce two outputs of the reference 6 kHz signal that are 90 degrees shifted in phase. The multiplier circuit forms the arithmetic product of the two input signals. That is, if the two inputs are signals x and y then the output is x*y. The outputs, 335 and 336, of the two multiplier circuits 330 and 331 are inputs A and B to combiner circuit 333 respectively. The combiner's output signal is equal to the arc tangent function of the ratio of inputs. This phase detector circuit will function over a phase difference range of 180 degrees. Note that ratio A/B becomes undefined when input B is equal to zero which will happen at two points 180 degrees apart in phase difference. Normally, the fixed values of phase shifts will be adjusted so that the phase detector circuits active range will lie between these two undefined values. The operating range of 180 degrees will correspond to a range variation of 25 km or 15.5 statue miles. This will be adequate for most applications of the technique to AMPS cellular telephone systems.

Referring again to FIG. 2, the output of the phase detector circuit 314 is averaged by low pass filter 315 to produce the desired signal to noise ratio. The filtered output is then digitized and passed on to the controller 320. The controller forwards the phase difference measurement along with the RSSI measurement to the MTSO where the position of the mobile unit is calculated.

A desirable enhancement for the filters would be to reset the filters 312 and 315 at the beginning of the measurement process so as to prevent noise signals received prior to the measurement from affecting the result.

There are many different methods of implementing phase detector circuits which will be apparent to those skilled in the art. An attractive implementation would be to digitize the SAT tone signal output from cellular receiver 311 and then to perform all of the functions of bandpass filter 312, phase detector 314 and low pass filter 315 in digital circuits. This would allow the synthesizer 302 output to be used directly without first converting this signal to analog form. These processing steps could also be performed by a suitable digital signal processor (DSP) circuit.

The position determination process is begun at the MTSO. If we assume that a given mobile unit is already in communication with the system and that it is determined that a position determination should be made for this mobile unit, the MTSO will control the following steps:

1) a command is sent to the mobile unit ordering it to change channels to the predetermined positioning channel;

2) the base station with which the mobile unit was in communication transmits on the channel with a predetermined SAT tone assignment of 6000 Hz;

3) the mobile unit receives and retransmits the SAT tone in the normal way; all the surrounding base stations measure the phase difference between the returned SAT tone and the reference tone derived from a received GPS timing signal;

4) the measurements are collected at the MTSO and the position computed; and 5) the mobile unit is commanded (by transmitting a normal control message) to return to its previous frequency to continue any call in may have in progress.

The MTSO will signal all the base stations in the system that the measurement is taking place and all base stations will attempt to make a phase measurement at the indicated time. Most of the base stations will be out of range of the mobile unit and will not make a meaningful measurement. The RSSI signal from such receivers will indicate a weak signal and the MTSO will ignore phase measurements from these base stations. Normally, only the closest neighbor base stations to the base station communicating with the mobile unit will make a meaningful measurement. The MTSO processing may in addition to ignoring phase measurements from receivers with low RSSI may also choose to ignore measurements from base stations not close to the communicating base station.

Figure 4:
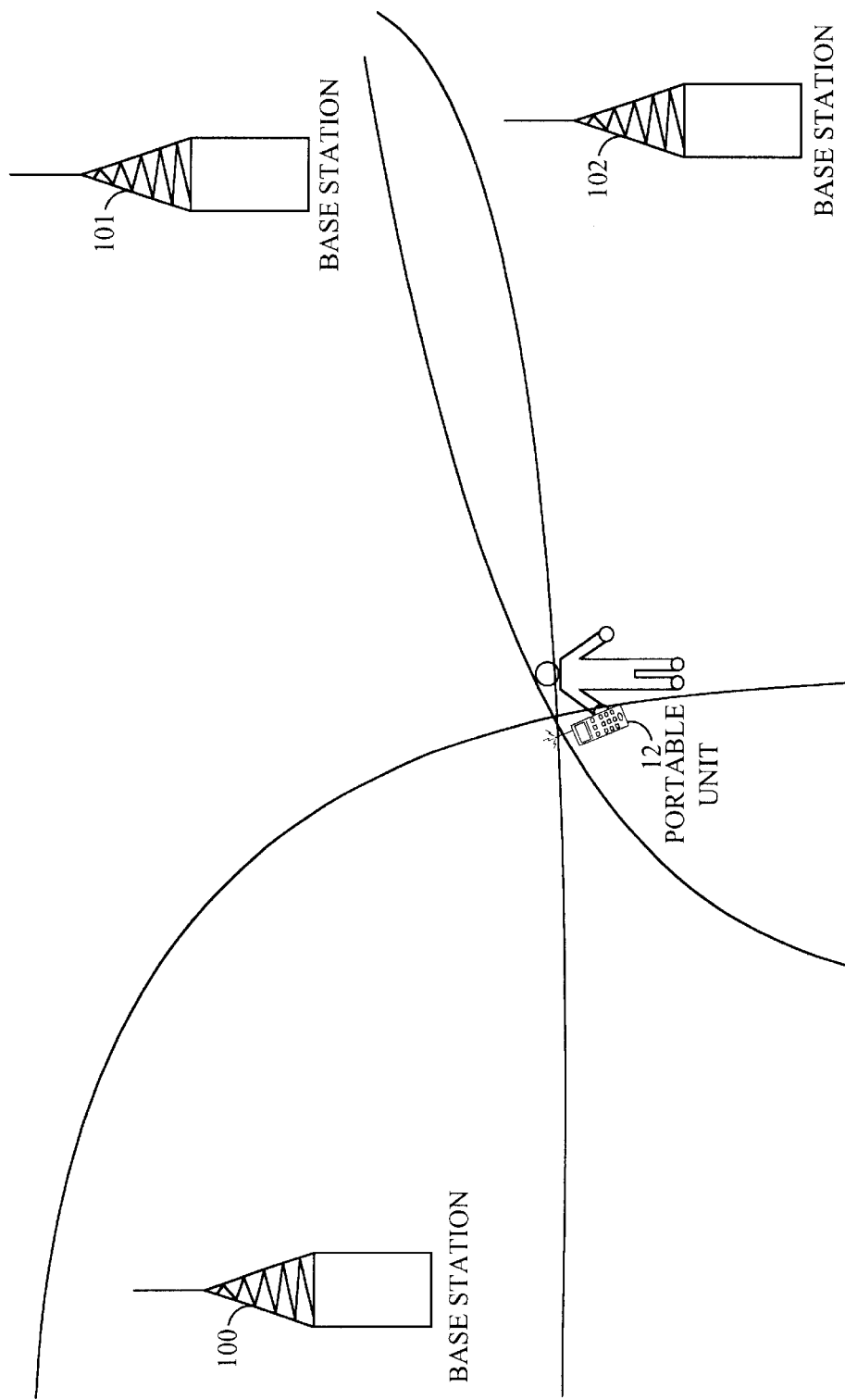
FIG. 4 is an example illustration of position location.

The position is determined as follows: phase measurements from pairs of base stations will define hyperbolic lines of position between the stations. For example, suppose the phase difference measurements for base stations 400 and 401 of FIG. 4 differ by 10 degrees, e.g., base station 400 measures −49 degrees relative to the reference and base station 401 measures −59 degrees. Thus, portable unit 412 is about 1 mile closer to base station 400 than base station 401. Furthermore, it is on a hyperbola which is the locus of points one mile closer to 400 than to 401. Suppose we also find that base station 402 measures portable unit 412 as −39 degrees relative to the reference. Thus, portable unit 412 is 10 degrees, or about 1 mile closer to 402 than to 400. Also, portable unit 412 is about 2 miles closer to 402 than to 401. We have now defined three hyperbolas. Where they intersect on a map is the location of the mobile unit. Algorithms for computing position based on time differences given the knowledge of the base station locations is well known in the art. In fact the computation process is identical to that used in the Loran positioning system except that the measurements and computations are performed at the base stations and MTSO instead of at the mobile unit.

On completion of the measurement process, the MTSO will command the mobile unit and base station to return to a regular (non-positioning) channel of the system to free up the positioning channel for another mobile unit to use.

Clearly, if all base station receivers are equipped to make the disclosed relative phase measurements then the position of all mobile units with calls in progress can be determined at the same time. The only significant additional problem with this is that there will likely be co-channel interference present due to the frequency reuse process normally employed by cellular systems.

It should be clear that the coverage area of each base station must be somewhat greater than that required for basic cellular service. Normally, a mobile unit needs be able to communicate with a base station to a point just a little past the midpoint between two base stations. For the positioning service to operate, the mobile unit must be capable of communication with neighboring base station from a point adjacent to the primary base station. Thus, the range which the mobile unit is capable of communication in position location operation must be about twice as great as that for normal operation. This will not be a problem in most cellular systems as cells have been split into coverage areas much smaller than that required for basic coverage in order to increase the capacity of the system to meet the demand for service. Hence, mobile units should normally be capable of communication with the necessary three base stations almost anywhere in the system's coverage area.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for operating an AMPS cellular telephone system comprising the steps of:
   (a) generating a SAT tone within a first base station, said SAT tone being synchronized to a received GPS signal;
   (b) transmitting said SAT tone from said first base station to a mobile unit;
   (c) re-transmitting said SAT tone from said mobile unit to a plurality of other base stations;
   (d) receiving said re-transmitted SAT tone at said plurality of other base stations, said plurality of other base stations each locally generating an audio comparison tone synchronized with said GPS signal, such that the plurality of other base stations do not use signals received from any other base station in order to locally generate the audio comparison tone;
   (e) calculating a plurality of phase differences between said received re-transmitted SAT tone and said locally generated audio comparison tone, each calculated phase difference corresponding to one of said other base stations;
   (f) calculating a plurality of distances between said other base stations and said mobile unit and an associated plurality of location curves using said plurality of phase differences; and
   (g) resolving a location of said mobile unit using said plurality of location curves.

2. The method as set forth in claim 1 further comprising the steps of:
   (a) generating a location request within a base station; and
   (b) transmitting said location request to said mobile unit.

3. The method of claim 1 further comprising the step of:
   (a) generating a plurality of quality indexes in response to said first audio tone received at said plurality of other base stations.

4. The method of claim 1, further including the step of:
   (a) determining within a system controller which mobile units require positions to be determined; and
   (b) transmitting commands from the system controller via a base station to mobile units determined to require positions and to the surrounding base stations.

5. An AMPS cellular telephone system comprising:
   (a) a mobile unit for retransmitting a received SAT tone via a reverse link traffic channel;
   (b) a plurality of base stations for receiving said SAT tone via said reverse link traffic channel and calculating a corresponding plurality of phase differences between said SAT tone and a comparison signal, said comparison signal being synchronized to an externally generated signal, the comparison signal being directly received by each of the plurality of base stations from a GPS satellite, such that the plurality of base stations do not use signals received from each other or any other base station in order to calculate the phase differences; and
   (c) a controller system for resolving a location of said mobile unit based on said plurality of phase differences.

6. The cellular telephone system of claim 5 wherein:
   (a) said plurality of base stations calculate a corresponding plurality of distances and associated plurality of location curves; and
   (b) said controller system resolves said location using said location curves.

7. The cellular telephone system of claim 5 wherein:
   (a) said controller system calculates a plurality of distances and associated location curves corresponding to said plurality of base stations using said plurality of phase differences, and resolves said location using said plurality of location curves.

8. The cellular telephone system of claim 5, wherein the forward and reverse link channels are clear channels.

9. The cellular telephone system of claim 5, wherein said system controller:
   (a) determine s which mobile units require positions to be determined; and
   (b) transmits commands from the system controller via a base station to mobile units determined to require positions and to the surrounding base stations.

* * * * *